UNITED STATES PATENT OFFICE.

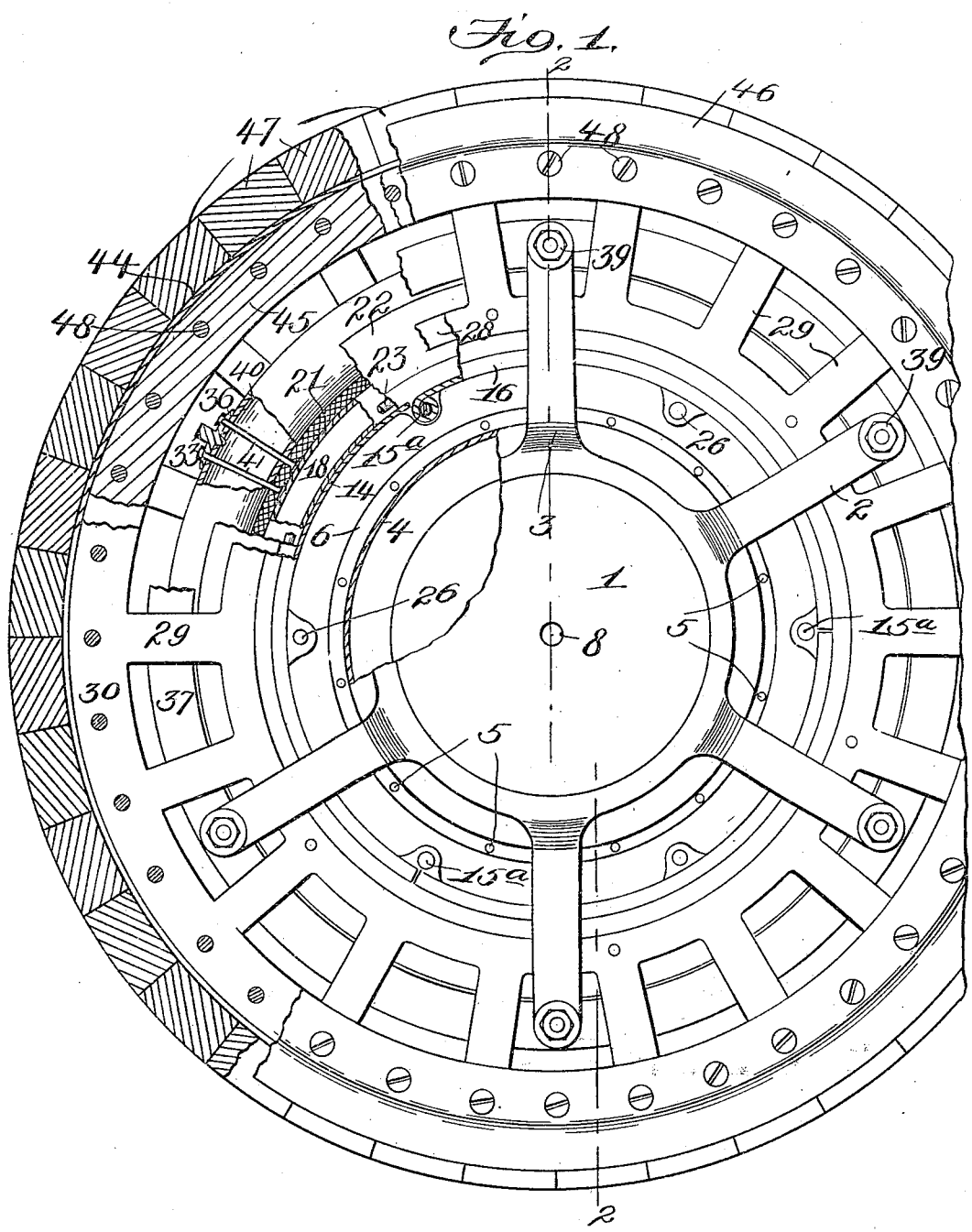

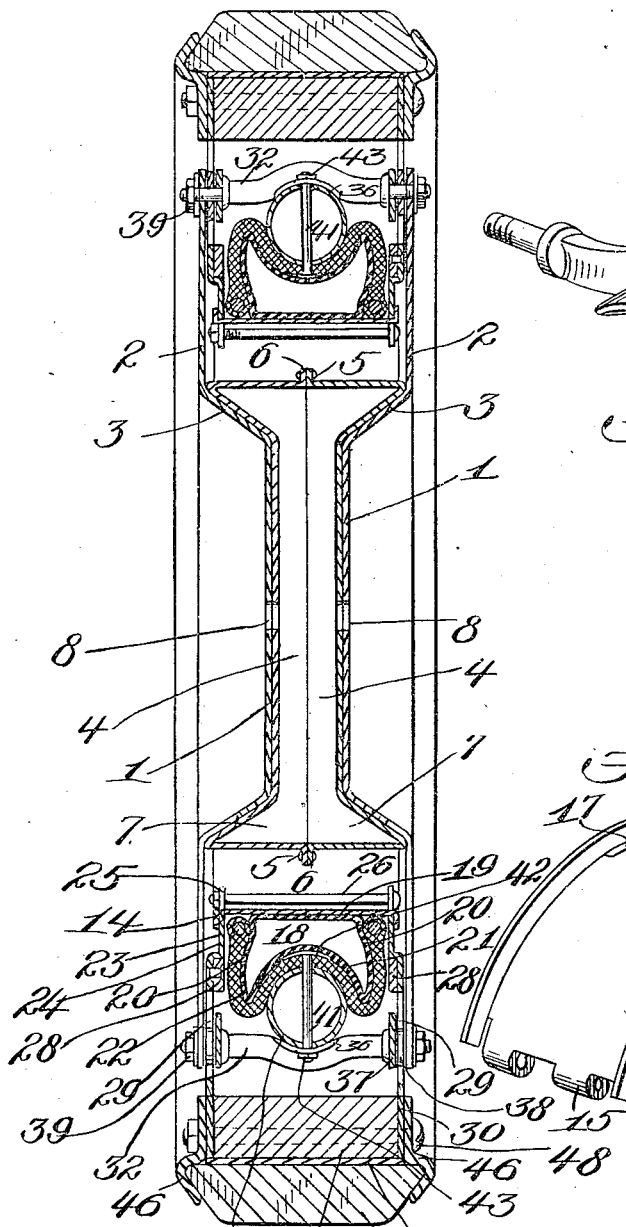

JOHN CHAMBERS RUTHERFORD, OF NEW YORK, N. Y., ASSIGNOR, BY DIRECT AND MESNE ASSIGNMENTS, TO IRON TIRE PNEUMATIC WHEEL COMPANY, OF NEW YORK, N. Y., A CORPORATION OF MAINE.

VEHICLE-WHEEL.

949,636. Specification of Letters Patent. Patented Feb. 15, 1910.

Application filed May 9, 1907. Serial No. 372,807.

*To all whom it may concern:*

Be it known that I, JOHN CHAMBERS RUTHERFORD, a citizen of the United States, residing at New York, in the county of New York and State of New York, have invented new and useful Improvements in Vehicle-Wheels, of which the following is a specification.

This invention relates to vehicle wheels, more particularly adapted for use in connection with motor vehicles; and the object thereof is to construct a wheel in a manner as hereinafter set forth which will embody all the advantages of a pneumatic or cushion wheel and so tired as to prevent the puncturing or injuring of the cushioning element whether said element be a pneumatic or solid one, and by such arrangement it is evident that longevity of the wheel is obtained.

A further object of the invention is to provide a wooden, iron, rubber, or composition tired, cushioned wheel for vehicles so constructed and arranged as to suspend the weight of the vehicle so as to relieve that portion of the cushioning element below the tire from pressure, and, furthermore, to provide the wheel with means which, if the pneumatic cushioning element becomes deflated, will form a substantially solid wheel so that even though the cushioning element should become deflated, the wheel could be utilized for traction purposes.

Further objects of the invention are to construct a wooden, iron, rubber or composition tired, cushioned wheel for vehicles, more particularly motor vehicles, which shall be simple in its construction, unusually strong, durable, having a cushioning effect when the vehicle meets with an obstruction or passing over uneven surfaces in the road-bed, efficient in its use, conveniently set up and inexpensive to manufacture.

With the foregoing and other objects in view the invention consists of the novel construction, combination and arrangement of parts hereinafter more specifically described and illustrated in the accompanying drawings wherein is shown the preferred embodiment of the invention, but it is to be understood that changes, variations, and modifications can be resorted to which come within the scope of the claims hereunto appended.

In describing the invention in detail reference is had to the accompanying drawings wherein like characters denote corresponding parts throughout the several views, and in which—

Figure 1 is a side elevation, broken away, of a vehicle wheel in accordance with this invention; Fig. 2 is a vertical sectional view on line 2—2, Fig. 1, the hub being shown in dotted lines; Fig. 3 is a perspective view of one of the combined retaining and suspension devices; Fig. 4 is a detail of a portion of the outer spoke section, and, Fig. 5 is a perspective view of one of the sections of the carrier forming an element of the combined cushioning and outer spoke section.

A vehicle wheel in accordance with this invention embodies an inner spoke section adapted to be secured to a hub, and in this connection it will be stated that the wheel is adapted to be secured to any construction of vehicle hub formed with a pair of flanges. By such arrangement it enables the elements of a wheel in accordance with this invention to be secured to the forms of hub now in general use.

The wheel further comprises a combined cushioning and outer spoke section and a tire section.

Referring to the drawings by reference characters, the inner spoke section is formed of two members, each of which consists of a circular disk 1 having a plurality of arms 2 projecting therefrom and each of which is offset, as at 3, so that the outer end of each of the arms will not extend in the same plane as the disk. The offset portions 3 of each of the arms 2 are outwardly and upwardly inclined. The arms 2 constitute the inner spokes of the wheel. The disks 1 are spaced apart and braced through the medium of a pair of flanged members 4 secured together by the hold-fast devices 5 which extend through the flanges 6 of said members. The outer portions of the members 4 are enlarged so as to conform to the shape of the offset portions 3 of the arms 2. Such enlargement of the members 4 is indicated by the reference character 7 and snugly fits between the offset portions 3 of the arms 2, as shown in Fig. 2. The disks 1 are each provided with an opening 8 for centering a mandrel when it is desired to form the necessary opening there-through for the axle spindle.

The combined cushioning and outer spoke section embodies a circular carrier 14 formed of a plurality of sections detachably connected together, one of the sections being shown in Fig. 5 and which is provided at each end with a pair of apertured ears 15 through which extends suitable means, as at 15ª, for detachably connecting the other sections thereto. By setting up the carrier 14 of a plurality of detachable sections, provision is made for the removal of the cushioning element without completely separating all the parts of the wheel. Each of the sections is furthermore provided with outwardly-extending flanges 16 and slots 17. Mounted upon the carrier is an irregular-shaped pneumatic tube 18 which constitutes the cushioning element, the tube 18 comprising a flat inner portion 19, side portions 20 upon a compound curve, and the outer portion 21 substantially concavo-convex in contour. A suitable means, not shown, is employed for inflating the tube 18. The flat portion 19 of the tube 18 is mounted upon the carrier 14, and, surrounding the tube 18 is a clenching element 22 therefor, which conforms to the shape of the side and outer portions of the tube 18. The sides of the clenching element 22 have embedded therein the retaining wires 23. Seated in the carrier, and abutting against the flanges 16 are the offset rings 24, each of which is formed with a plurality of apertured lugs 25 adapted to extend through the slots 17. The lugs 25 of one ring are secured to the lugs 25 of the other ring through the medium of the hold-fast devices 26 which are arranged within the carrier (see Fig. 2). The offset portion of each of the rings 24 is indicated by the reference character 27 and constitutes a seat for the abutment ring 28. The latter also acts as a means to limit the outward movement of the tire section when the tube is deflated so that a substantially solid wheel will be set up. Projecting radially from each of the rings 24 is a series of arms 29 which form the outer spokes of the wheel and terminate in a coupling ring 30 formed with a plurality of openings 31.

The inner spoke section is shiftably connected to the combined cushioning and outer spoke section through the medium of a plurality of combined retaining and suspension devices each of which consists of a bar 32 and a curvilinear intermediate portion 33 shouldered near each end, as at 34, and having each terminal screw-threads, as at 35. Formed integral with the intermediate portion 33 is a substantially concavo-convex bearing member 36 which projects from each side of the bar 32. Each of the terminals 35 extends through an outer abutment ring 37 and against which is mounted a washer 38. Each of the terminals 35 also extends through an inner spoke. The inner spokes are retained upon the terminal 35 through the medium of the nuts 39. Interposed between the clencher 22 and the bearing members 36 is a steel tube 40 which constitutes an abutment for the cushioning tube, and a further function of which is to so contract the tube 18 and clencher 22 as to draw the sides of the clencher away from the offset rings 24 and abutment 28 so as to prevent wearing of the clencher. The latter is connected with the bearing members 36 by the bolts 41, each having a segment-shaped head 42 which is interposed between the clencher and the tube 18. The bolts 41 extend through the clencher 22, tube 40 and bearing members 36 and are retained in position by the nuts 43.

The tire section consists of a rim 44, which is mounted against the outer edge of the coupling rings 30. A spacing means 45 in the form of a wooden felly is interposed between the coupling rings 30 and a clamp 46 is positioned against the outer face of each of the coupling rings 30. Mounted against the rim 44 is a tire 47 which may be of any suitable construction, but as shown, consists of a series of closely-abutting wooden blocks substantially wedge-shaped in contour and of greater width than the width of the rim 44. The outer ends of the clamps 46 are adapted to take over the sides of the tire 47 so as to connect it to the wheel. The clamps 46, coupling rings 30 and felly 45 are secured together by hold-fast devices 48 which extend through the openings 31, felly 45 and clamps 46.

By setting up a wheel in accordance with the foregoing construction, the weight of the vehicle instead of passing through the hub directly to the ground, is first carried from the hub to the upper portion of the member 40 which rests upon the cushioning element. The weight of the vehicle is carried through the cushioning element to that portion of the wheel which rests upon the ground. This causes the weight of the vehicle to be suspended upon the upper half of the cushioning element, instead of bearing upon a few inches on the ground when the cushioning element is used as an outer tire, thereby causing greater elasticity and resiliency and at the same time absorbing all shocks and jars and preventing their reaching the inner portion of the wheel. The indented or depressed shape of the clencher or cover for the cushioning element causes a decrease in the volume capacity of the cushioning element and increases the contact area of its carrying surface; it furthermore prevents rim cutting of the outer cover or clencher. The increase in the contact area of the carrying surface decreases the movement of the tube in either direction from its original position, thereby reducing the strain upon the lugs which hold it immovable and furthermore prevents compression of the cushioning element under any load or under sudden shock, thereby causing the cushioning element to at all times maintain its constant initial pressure, consequently preventing blow outs or bursting of the outer protecting tube. The cover or clencher being firmly attached to the member 40 by means of the lugs and the said member being rigid, any weight or shock bearing thereon and causing sudden compression at any point occasions a movement of the said member as an entirety and furthermore creates a corresponding expansion and increase in volume capacity in the cover or clencher at the point directly opposite which is immediately filled by the cushioning element which would otherwise have been compressed. It also causes an absence of vibration to the inner portion of the wheel as well as the hub and vehicle, as by reason of the non-compressibility of the cushioning element, all shocks and jars are absorbed and cannot be imparted to the inner portion of the wheel, hub or vehicle. When the vehicle is at rest, its weight is supported by that part of the wheel lying in a vertical plane passing through the center of the wheel and hub, but upon starting the vehicle force is first applied through the hub to the bars carrying the bearing members.

What I claim is—

1. A vehicle wheel comprising an inner spoke section consisting of a pair of disks each formed with a plurality of radially-extending arms, each of which has a portion offset and spacing and bracing means interposed between the disks and offset portions of the arms, said arms constituting the inner spokes of the wheel, a combined cushioning and outer spoke section shiftably connected to said inner spokes and embodying a carrier having two series of radially-extending arms connected thereto, a cushioning part associated with the carrier, and coupling rings formed integral with the arms, and a tire section fixed to said coupling rings.

2. A vehicle wheel comprising an inner spoke section consisting of two members fixedly secured together and each of which is formed with a plurality of radially-extending arms constituting the inner spokes of the wheel, a combined cushioning and outer spoke section embodying a carrier, a cushioning element mounted thereon, a member mounted to bear against the cushioning element, a plurality of combined retaining and suspension devices connected to the inner spokes and cushioning element and bearing against said member, two series of radially extending arms connected to the carrier, a coupling ring formed integral with each series of said arms, and a tire section connected to the coupling rings.

3. A vehicle wheel comprising an inner spoke section consisting of two members fixedly secured together and each of which is formed with a plurality of radially-extending arms, constituting the inner spokes of the wheel spacing means for the two series of arms, a combined cushioning and outer spoke section embodying a carrier formed of a plurality of detachable members, a cushioning element mounted thereon, a member mounted to bear against the cushioning element, a plurality of combined retaining and suspension devices connected to the cushioning element and to the inner spokes and shiftably connecting the outer and inner spoke sections, said devices bearing against said member, two series of radially-extending arms detachably connected to the carrier, a coupling ring formed integral with each series of said arms, and a tire section detachably connected to the coupling rings.

4. A vehicle wheel comprising a plurality of inner spokes, a carrier, offset rings detachably connected to the carrier, a series of radially-extending arms formed integral with each of said rings and constituting the outer spokes of the wheel, abutment rings seated in said offset rings, a cushioning element mounted upon the carrier, a plurality of combined retaining and suspension devices means connecting said devices and the cushioning element, coupling rings formed integral with the arms projecting from said offset rings, and a tire connected to said coupling rings.

5. A vehicle wheel comprising a plurality of inner spokes, a cushioning element embodying a clencher, a carrier for said element, an abutment for said element, combined retaining and suspension devices bearing against said abutment, and connected to the inner spokes, means for connecting the suspension devices to the clencher, said means extending through the abutment, two series of radially extending outer spokes connected with the carrier, and a tire connected with the outer spokes.

6. A vehicle wheel comprising inner spokes, a cushioning element carrying means interposed between the inner spokes, a cushioning element mounted upon said carrying means, an abutment bearing against said cushioning element, combined retaining and suspension devices mounted upon said abutment and connected to the inner spokes, said devices being independent of the cushioning element carrying means, outer spokes connected with said carrying means, a tire, and means for connecting the tire and the outer spokes.

7. A vehicle wheel of the class described, comprising a combined cushioning and outer spoke section embodying a carrier, an irregular shaped pneumatic tire mounted upon said carrier and constituting cushioning means, and a clencher corresponding in contour to and encircling the tire, combined with inner spokes, an abutment bearing against the clencher and means connected to the inner spokes and bearing against the abutment to retain the same, said means having associated therewith means extending through the abutment and connected to the clencher.

8. In a vehicle wheel of the type set forth, in combination, an inner section, an outer section shiftably related thereto and comprising a carrier formed of detachably connected sections, outer spoke means carried by the carrier, outer tire means connected to said outer spoke means, a cushioning part mounted on the carrier, and means for connecting said inner section and said outer section in shiftable relation comprising devices detachably secured to the inner section and having abutment means associated therewith and engaging said cushioning part.

9. A vehicle wheel of the class described comprising an inner section and a cushioning section shiftably related thereto and embodying a carrier, a pneumatic tire mounted thereon and having a flattened inner portion, curvilinear sides and an outer portion substantially concavo-convex in contour, a clencher inclosing the tire and corresponding in contour thereto, a member mounted to bear against the concavo-convex portion of the clencher, and combined retaining and suspension devices bearing against said member and connected with the clencher.

10. A vehicle wheel embodying an inner spoke section, an outer cushioning section, a tire section assembled upon the cushioning section and a cushioning element forming a part of the cushioning section, combined with means for shiftably connecting the inner spoke section to the cushioning section, said means consisting of a plurality of bars having the terminals thereof screw-threaded and provided intermediate the ends with bearing members, and nuts mounted upon said terminals.

11. A vehicle wheel comprising an inner spoke section, a combined cushioning and outer spoke section embodying a pneumatic cushioning element, means for shiftably connecting the inner spokes to the combined cushioning and outer spoke section, separable abutments carried by said means for limiting the inward movement of said combined cushioning and outer spoke section when the tire is deflated, bearing means carried by the connecting means and associating with the cushioning element, and a tire section connected to said combined cushioning and outer spoke section.

12. A vehicle wheel comprising an inner spoke section, an outer spoke section shiftably related to the inner section, a tire carried by the outer spoke section, a cushioning element forming a part of one of said sections, a plurality of transverse bars detachably connected to the other section and an abutment member surrounding and coöperating with the cushioning element and bearing against said bars.

13. In a vehicle wheel of the type set forth, in combination, relatively shiftable sections, a cushioning means forming a part of one section and including a carrier, a cushioning element assembled upon the carrier, and a covering for said element having a central circumferential depressed portion, an annular abutment member engaging in the depressed portion and combined retaining and suspension devices carrying said member and detachably connected to the other section.

14. In a vehicle wheel of the type set forth, in combination, relatively shiftable sections, a cushioning means forming a part of one section and including a carrier, a cushioning element assembled upon the carrier and retaining means including an abutment means associating with the cushioning element, and devices carrying the abutment means and means for detachably connecting said devices to the other section.

15. A vehicle wheel comprising an inner spoke section, an outer spoke section shiftably related to the inner section, a tire carried by the outer spoke section, a cushioning element forming a part of one of said sections, a plurality of transverse bars detachably connected to the other section and having centrally located bearing portions, an abutment member surrounding and cooperating with the cushioning element and seated against the bearing portions of said bars and means for connecting said abutment member to said bars.

16. A vehicle wheel comprising an inner spoke section, an outer spoke section embodying two side spoke structures, a tire, means for connecting said tire to said side spoke structures, a carrier formed of sections detachably connected to one another and means connecting said sections detachably to said side spoke structures, cushioning means mounted upon said carrier and means for connecting said spoke sections, carried by the inner section, and having means associated therewith to bear against said cushioning means.

17. A vehicle wheel of the class described, comprising an inner spoke section, a combined cushioning and outer spoke section shiftably related to the inner section, a carrier formed of a series of removably assembled sections detachably connected to one another and stationary with respect to one of said spoke sections, cushioning means removably and concentrically assembled upon the carrier, and means stationary with respect to the other spoke section and detachably and positively connected thereto, for engaging the cushioning means thereby connecting said sections in shiftable relation.

18. In a vehicle wheel of the type set forth, in combination, relatively shiftable sections and cushioning means interposed between the sections and including a carrier rigidly associated with one of the sections and made in separably assembled segments, a cushioning element mounted on the carrier and bearing means associating with the cushioning element and carried by the other section.

19. A vehicle wheel of the class described comprising relatively shiftable sections, a cushioning means carried by one of said sections and embodying a carrier, a cushioning element mounted thereon, a clencher inclosing said element and corresponding in contour thereto, and an annular abutment mounted against the clencher and having one face conforming in contour to the shape of the outer portion of the clencher, and combined retaining and suspension devices carried by the other section and bearing against said abutment.

20. The combination with abutment means and members carrying the abutment means of shiftably related inner and outer spoke sections, a tire carried by the outer spoke section, cushioning means associated with the abutment means, a carrier for the cushioning means and carried by one of said sections and means detachably connecting said members to the other of said sections.

21. In a vehicle wheel of the class described, in combination, a shiftable outer spoke section, embodying a carrier connected thereto, rings having projections extending through the carrier, and means connected to the projections for attaching the rings to the carrier, a cushioning element mounted on the carrier, radially extending arms carried by each of said rings, an outer tire section mounted at the ends of the arms, an inner spoke section, and means connecting the inner and outer spoke sections and having associated therewith means bearing against the cushioning element.

In witness whereof I have hereunto set my hand in presence of two subscribing witnesses.

JOHN CHAMBERS RUTHERFORD.

Witnesses:
WILLIAM SCULLY,
CLAREMONT L. SALZBURG.